Sept. 19, 1939.                M. L. BASCOM                  2,173,573
                             ROAD SANDING DEVICE
                    Filed Dec. 18, 1937           2 Sheets-Sheet 1

Inventor
Merton L. Bascom
By Rockwell Bartholow
Attorneys

Sept. 19, 1939. M. L. BASCOM 2,173,573
ROAD SANDING DEVICE
Filed Dec. 18, 1937 2 Sheets-Sheet 2
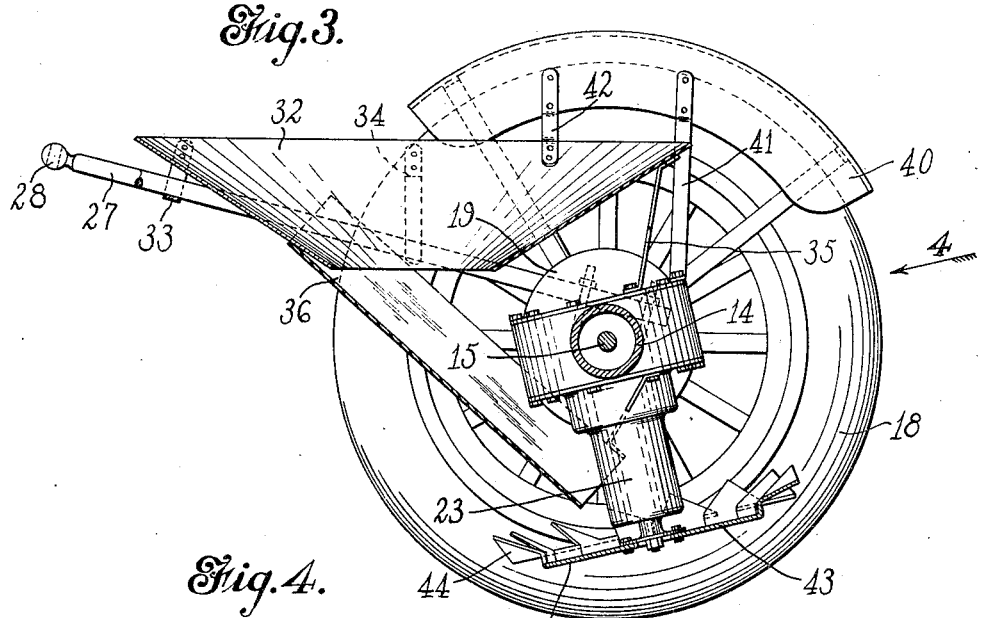
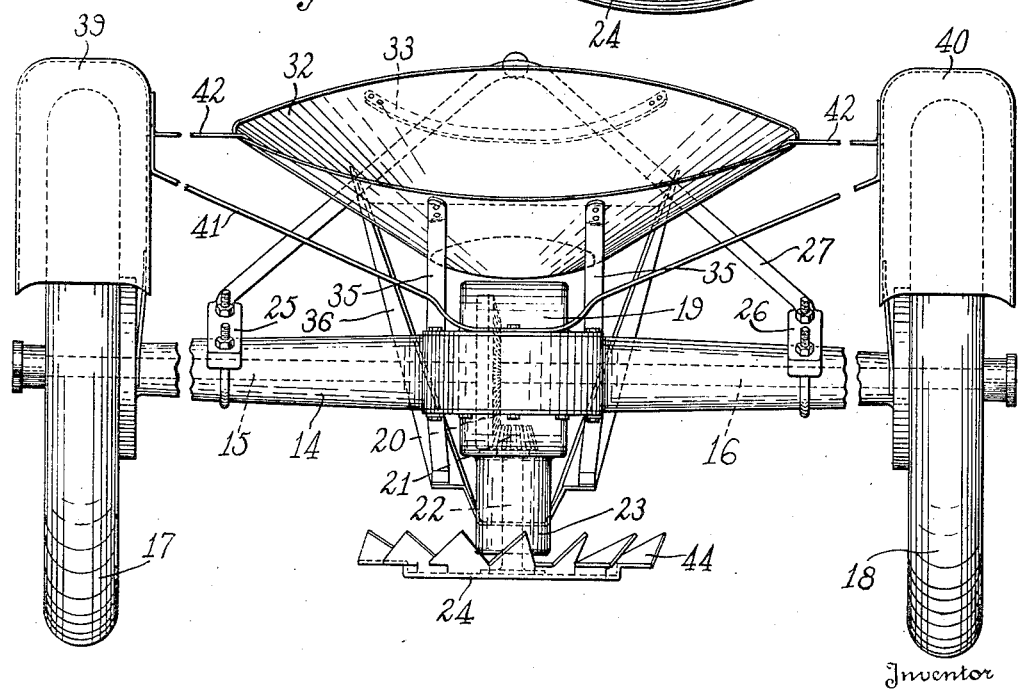

Patented Sept. 19, 1939

2,173,573

UNITED STATES PATENT OFFICE 2,173,573

ROAD SANDING DEVICE

Merton L. Bascom, Charlestown, N. H.

Application December 18, 1937, Serial No. 180,587

4 Claims. (Cl. 275—8)

This invention relates to distributing devices for sand or the like, and more particularly to a device of this character in the form of a trailer designed to be attached to the rear of a vehicle. The trailer in the present instance is provided with supporting wheels which also serve as drive wheels for driving the distributing mechanism. Means are also provided on the trailer to receive sand or other material to be distributed from the vehicle, which it is contemplated will be designed to act as the carrier for the material. That is, the vehicle not only serves as the draft vehicle to draw the trailer, but also is intended to carry the load of material, this material being delivered to the trailer only as it is to be distributed, so that the latter will be relieved of any load-carrying function.

Moreover, the device contemplated by the invention may be readily made by the conversion of the rear axle portion of an ordinary automobile, which can be detached and converted into a distributing trailer with a minimum of work and expense.

One object of the invention is the provision of a distributing mechanism for sand or the like in the form of a trailer, the device being adapted to be drawn by the load-carrying vehicle.

Another object of the invention is the provision of a trailer of the character described provided with supporting wheels which also serve as the drive wheels for driving the distributing mechanism.

Another object of the invention is the provision of a trailer distributing device of the character described which may be readily attached to a truck or other vehicle without alteration of the latter by a minimum of work, and the ordinary truck thus converted into a material distributor.

Other objects will appear as the invention proceeds, and it will, of course, be obvious that the trailer may be readily detached and the vehicle then used for any purpose desired, and the distributing trailer re-attached again when its use is desired.

To these and other ends the invention consists in the novel features and combinations of parts to be hereinafter described and claimed.

In the drawing:

Fig. 3 is a view partially in section on line 3—3 of Fig. 2; and

Fig. 4 is a rear elevational view of the trailer, taken in the direction shown by arrow 4 on Fig. 3.

Figure 1:
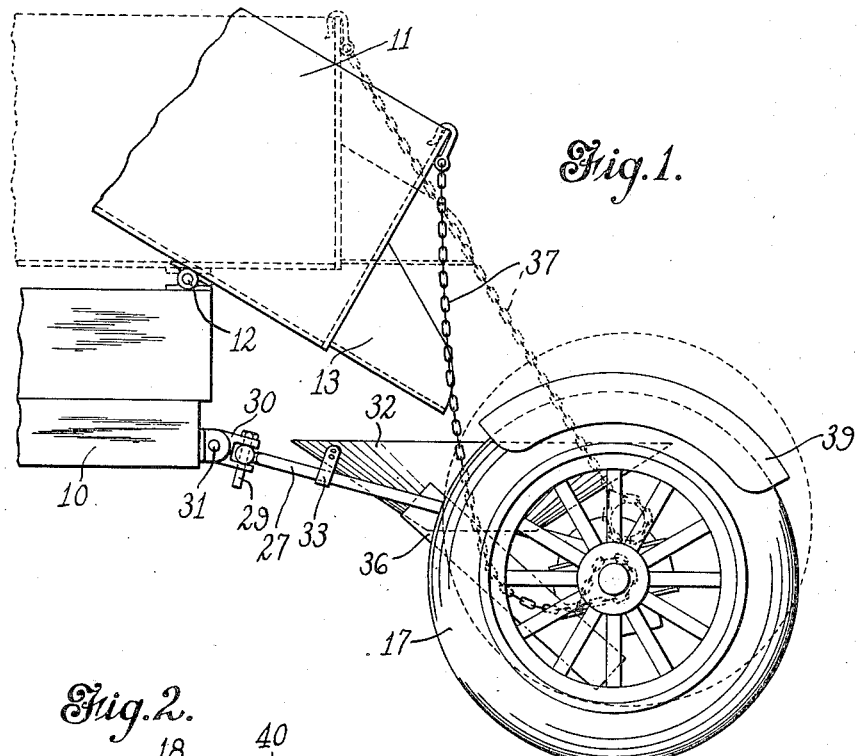
Fig. 1 is a side elevational view of a distributing trailer embodying my invention attached to the rear portion of a vehicle.
Figure 2:
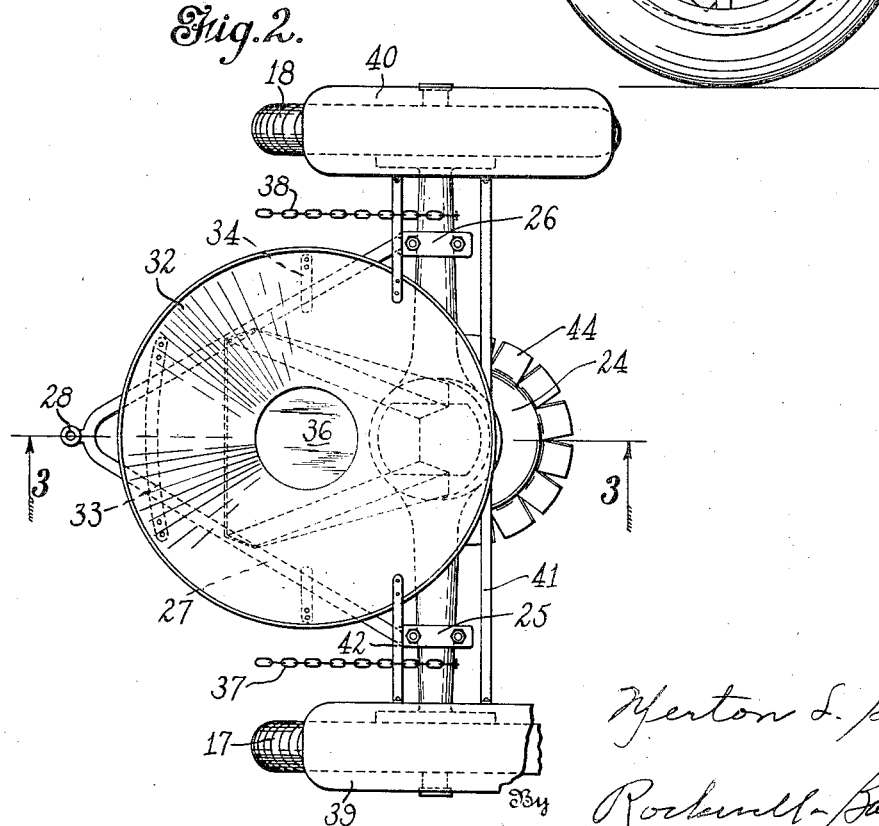
Fig. 2 is a top plan view of the distributing device.

To illustrate a preferred embodiment of my invention, I have shown in a more or less conventional way the rear portion of a vehicle 10 upon which is mounted a body 11 designed to swing about the pivot 12 for dumping or unloading purposes. The body may be provided with a chute 13 through which the sand or other material may be delivered to the distributing devices on the trailer about to be described.

The trailer in the form shown comprises an axle housing 14 within which are mounted axles 15 and 16 carrying the supporting wheels 17 and 18. As shown, this trailer may conveniently be the rear axle portion of an automobile, the axle housing 14 being provided near its central portion with a differential housing 19 in which is mounted the usual automobile differential (not shown), and drive gear 20, which meshes with a driving pinion 21 secured upon the shaft 22. The shaft 22 is housed in the usual torque tube 23, and projects therefrom at its lower end to carry the distributing disk 24.

While the structure of the trailer described above may of course be made in any way desired, it will be seen that the ordinary rear axle construction of any common automobile may be conveniently employed, the shaft 22 being the usual drive shaft. This drive shaft is shortened, as is also the torque tube 23, and turned downwardly from the usual horizontal position it occupies in an automobile, so that it projects downwardly from the axle housing 14. It will be seen that according to the usual and well-known construction of this type of device the wheels 17 and 18 will, through the axles 15 and 16 and usual differential (not shown) drive the gear 20, the pinion 21, shaft 22, and distributing disk 24.

As shown more especially in Fig. 3, the distributing disk is inclined upwardly and rearwardly from the horizontal, the shaft 22 having a corresponding inclination rearwardly from the vertical. This provides for the throwing of the distributed material in an upward direction instead of in a horizontal direction, and thus causes the device to have a wider range of coverage than would be the case if the disk were disposed in a horizontal plane. That is, if the device is used for distributing sand over a paved road, for example, a considerable portion of the width of the road may be covered in a single passage of the device.

To the axle 14 is secured by means of suitable brackets 25 and 26 a wish-bone 27, which at its forward end is provided with an eye 28 adapted to receive a pin 29 passed through a clevis 30 pivoted at 31 to the frame 10. This wish-bone structure 27 serves as the draft coupling to attach the trailer to the vehicle.

Also mounted upon the trailer is a hopper 32, which may be secured in place by straps 33 and 34 supported by the wish-bone, and other straps 35 supported from the axle housing 14. Secured below the hopper is a chute 36 which, as seen more especially in Fig. 3, is directed downwardly from the hopper opening to deliver material to the distributing disk 24. The hopper is supported upon the trailer in the proper position, as shown in Fig. 1, to receive material from the chute 13 at the rear end of the vehicle body 11.

Suitable means such as chains 37 and 38 may be secured to the axle housing 14 and extend therefrom to be attached to the pivoted body 11, as shown in Fig. 1. In this figure the dumping body is shown in full lines in inclined position to permit escape of the material to be distributed through the chute 13. In this position of the body the chains 37 and 38 permit the wheels 17 and 18 to contact with the ground, whereby they will be rotated to drive the disk 24. When it is not desired to use the trailer for distributing purposes, but only desired to transport it, and the dump body is returned to horizontal position, as shown in dotted lines in Fig. 1, the chains 37 and 38 are of such a length as to then raise the wheels 17 and 18 from contact with the ground, as shown in Fig. 1, so that, while being thus transported, the distributing device is inoperative.

If desired, fenders 39 and 40 may be provided for the wheels 17 and 18, these fenders being supported by straps 41 and 42 extending respectively from the axle housing and from the hopper 32.

The distributing disk 24 is of novel form and may be formed as shown in Figs. 3 and 4. This disk may be conveniently made from an ordinary automobile brake drum, or a piece of material of similar shape. The face of the drum is the flat disk 43, which is bolted to a flange at the lower end of the shaft 22. The side wall of the drum is provided with a plurality of longitudinally extending slots or cuts, and the material of the wall between these slots is bent outwardly to form vanes 44 which, it is seen, project outwardly beyond the plate or base portion 43. These vanes are then slightly twisted or skewed, as clearly shown in Figs. 3 or 4, to throw the sand or other material delivered by the chute 36 outwardly by centrifugal force, and impart to it sufficient velocity so that the device will have a considerable spread when in use.

It will be apparent that my distributing trailer may be readily attached to a draft vehicle, such, for example, as the ordinary dump truck, by means of the clevis 30 and chains 37 and 38, and transported from place to place with the wheels held out of contact with the ground in inoperative position. When it is desired to distribute the material carried by the truck, the body 11 of the latter is tilted so that the material will drop from the truck through the chute 13 into the hopper 32. This tilting of the truck body permits the wheels to come in contact with the ground, and thereafter any movement of the truck causes the turning of these wheels to drive the distributing mechanism as explained. Thus the material dropping from the chute 13 passes through the hopper 32, down the chute 36, where it is delivered to the distributing device 24, and thrown outwardly and upwardly over the road surface.

It will also be noted that the device may be readily detached from the truck, and the latter is not altered in any way, but may be used for any purpose desired, and that, moreover, the attachment and detachment of the distributing trailer are very simple operations, and the device has many advantages over devices of this character which are built on to the truck itself and do not operate as trailers.

It may also be noted that in the use of my device the load is carried entirely by the draft vehicle or truck, and only delivered to the trailer as it is to be distributed. For this reason the trailer is relieved from any load-carrying functions, and may be for this reason very economically made.

While I have shown and described a preferred embodiment of my invention, it will be understood that it is not to be limited to all of the details shown, but is capable of modification and variation within the spirit of the invention and within the scope of the appended claims.

What I claim is:

1. In a device for distributing sand or the like, a trailer comprising an axle housing, axles mounted in said housing and extending from the opposite ends thereof, wheels secured to the projecting ends of the axles, a second housing carried by the axle housing substantially intermediate the ends thereof and projecting downwardly and rearwardly therefrom, a shaft in said last-named housing geared to said axles to be driven therefrom, said shaft extending to a point adjacent the road surface, a distributing element carried by said shaft in a plane substantially perpendicular thereto whereby said element is tilted upwardly in a rearward direction, a hopper supported from and forwardly of said axle housing to receive sand from a vehicle, means for directing the sand from the hopper to the distributing element, and means secured to said housing for hitching the trailer to a towing vehicle.

2. In a device for distributing sand or the like, a trailer comprising an axle housing, axles mounted in said housing and extending from the opposite ends thereof, wheels secured to the projecting ends of the axles, a second housing carried by the axle housing substantially intermediate the ends thereof and projecting downwardly and rearwardly therefrom, a shaft in said last-named housing geared to said axles to be driven therefrom, said shaft extending to a point adjacent the road surface, a distributing element carried by said shaft in a plane substantially perpendicular thereto whereby said element is tilted upwardly in a rearward direction, a hopper supported from and forwardly of said axle housing to receive sand from a vehicle, means for directing the sand from the hopper to the distributing element, and means secured to said housing for hitching the trailer to a towing vehicle, said means being a V-shaped element the sides of which embrace and are secured to the hopper.

3. In a device for distributing sand or the like, a trailer comprising an axle housing, axles mounted in said housing and extending from the opposite ends thereof, wheels secured to the projecting ends of the axles, a second housing carried by the axle housing substantially intermediate the ends thereof and projecting downwardly and rearwardly therefrom, a shaft in said last-named housing geared to said axles to be driven therefrom, said shaft extending to a point adjacent the road surface, a distributing element carried by said shaft in a plane substantially perpendicular thereto whereby said element is tilted upwardly in a rearward direction, a hopper supported from and forwardly of said axle housing to receive sand from a vehicle, means for directing the sand from the hopper to the distributing element, and means secured to said housing for hitching the trailer to a towing vehicle, said distributing element being disposed at a level adjacent the road surface, and said directing means being disposed generally forwardly of the axle.

4. In a sand distributing device, a trailer comprising an axle housing, an axle structure in said housing and having projecting ends on which ground wheels are mounted, a V-shaped member secured to said housing and having its apex directed forwardly therefrom for connection to a towing vehicle, a hopper mounted between the legs of said member and secured thereto and to the housing, a second housing secured to the first and directed downwardly and rearwardly therefrom, a shaft within said last-named housing driven from the axle structure, a distributing element carried by the lower end of said shaft in a plane substantially perpendicular thereto, and a chute located generally forwardly of the axle housing to direct material from said hopper to the distributing element.

MERTON L. BASCOM.